March 1, 1927.
L. F. DUFF
BLADE HOLDER
Filed Aug. 5, 1926
1,619,249
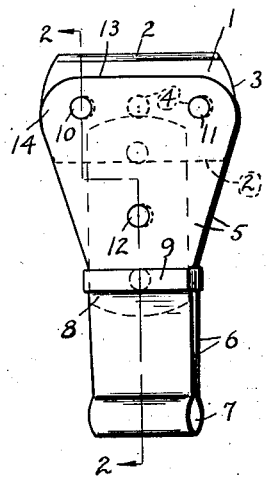
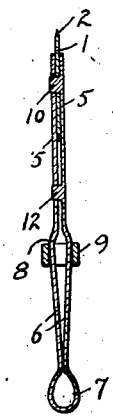
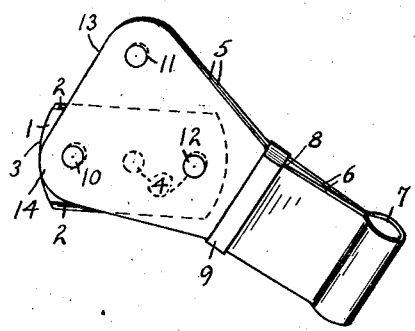
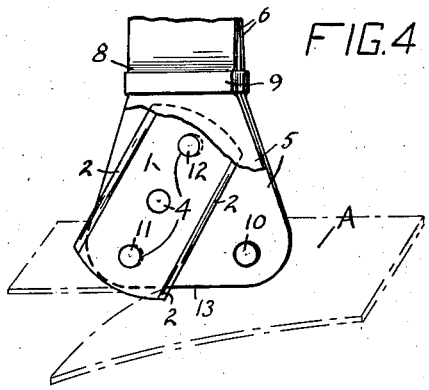
INVENTOR.
LEE F. DUFF
BY
ATTORNEY.

Patented Mar. 1, 1927.

1,619,249

UNITED STATES PATENT OFFICE.

LEE F. DUFF, OF LOS ANGELES, CALIFORNIA.

BLADE HOLDER.

Application filed August 5, 1926. Serial No. 127,243.

This invention is a holder for a safety razor blade adapted to form a tool which may be used as a cutter of general utility, or as a scraper for removing paint and the like, the tool when used as a cutter being particularly adapted for ripping seams or for use as a scoring blade having a cooperating guide.

It is the object of the invention to provide a holder which will mount a usual safety razor blade in any one of a plurality of positions so as to adapt the blade to a desired use, and which permits the blade being quickly and conveniently adjusted to a desired position.

It is a still further object of the invention to provide a holder insuring positive retention of the blade in adjusted position by operation of an extremely simple but practical clamping means.

The invention will be readily understood from the following description of the accompanying drawings in which:

Fig. 1 is a front elevation of the holder with a blade in position for use as a scraper.

Fig. 2 is a section on the line 2—2 of Fig. 1.

Fig. 3 is a front elevation showing a blade mounted in position for use as a ripper.

Fig. 4 is a front elevation partly broken away and showing the tool used as a scoring medium.

The holder is adapted for use in connection with a usual safety razor blade 1 of the type having opposite cutting edges 2, and curved ends 3, and which is provided with openings 4 spaced along the blade and being three in number to permit the blade being mounted in a usual safety razor handle.

The holder is an integral structure, folded intermediate of its ends to form parallel jaws 5 projecting from shanks or handles 6 which are connected by the outwardly bowed fold 7, the holder being of suitable metal or other material having inherent resiliency whereby the outwardly bowed fold 7 permits relative movement of the jaws 5 for clamping or releasing the blade. The shanks 6 are divergently offset toward the jaws 5 to form inclined shoulders 8 as shown in Fig. 2; and a ferrule 9 encompasses the shanks 6 and is slidable between the bow 7 and the shoulders 8 so as to release the jaws when adjacent the bow and clamp the jaws relative to one another when slid along the inclined shoulders. The sides of the jaws flare outwardly so that the outer ends of the jaws are substantially the width of blade 1; and alined studs and apertures on the cooperating jaws are arranged in triangular form with studs 10—11 spaced transversely of the jaws adjacent their outer ends so that the end openings 4 of the blade may be received upon said studs to position a cutting edge of the blade parallel to and projecting beyond the ends of the jaws so as to adapt the tool for use as a scraper, as shown in Fig. 1. The third stud 12 is midway between the sides of the jaws and adjacent their inner ends, and is so positioned that the end openings 4 of a blade may be received over either the studs 10—12 or 11—12 to angularly project the ends of the opposite cutting edges of the blade beyond the sides and ends of the jaws respectively, as shown in Figs. 3 and 4. With the blade thus angularly positioned it may be used for scoring a sheet A, as shown in Fig. 4, with the ends 13 of the jaws forming a guide for the scoring edge of the blade; or the tool may be used for ripping seams or for general use as a cutting blade as shown in Fig. 3, by using the edge 2 of the blade which projects beyond the sides of the jaws. The corners between the sides and ends of jaws 5 are preferably rounded off as shown at 14 so that when the blade is used as a scraper its curved ends 3 merge into the curved corners 14, and when the blade is used as a scoring or cutting blade, its curved ends 3 extend along the curvature of corners 14. The curved corners of the jaws thus overlie the curved ends of the blade, irrespective of the position of the blade in its holder, so as to project only the cutting edges 2 beyond the jaws in proper position for a desired use of the tool.

With the studs extending through the end openings 4 of a blade and then received in the cooperating apertures in the opposite jaw as shown in Fig. 2, the jaws may be clamped tightly against the blade by sliding ferrule 9 along the inclined shoulders 8, and the blade is thus positively held in exactly the desired adjusted position. By sliding ferrule 9 toward the bow 7 so as to release the clamping engagement of the jaws, the blade may be quickly changed to any other of its operative positions. The holder also provides for completely concealing the blade when it is out of use, and for this purpose the central opening 4 of the blade may be received on the stud 12 so that when the blade is clamped between the jaws, it extends lengthwise of the holder with its ends 3 and cutting edges 2 spaced inwardly from the ends and sides of jaws 4 as shown in dotted lines in Fig. 1.

The improved holder thus provides a convenient mounting for a safety razor blade whereby the blade may be concealed in the holder to protect its cutting edges, or may be adjusted and readily clamped in the holder with a cutting edge of the blade projecting in position adapted for either a scraping or cutting operation.

I claim:

1. A holder for a cutting blade which has opposite cutting edges and a pair of openings spaced lengthwise of the cutting edges, said blade holder having a pair of engaging means spaced transversely of the holder adjacent its outer end and adapted to engage the blade openings for positioning the blade with one of its cutting edges parallel to and projecting beyond the outer end of the holder, the holder also having a single engaging means medially of its width, adjacent its inner end and adapted to engage one of the blade openings with the other blade opening engaged by either of said pair of engaging means to position the blade with its opposite cutting edges projecting angularly beyond a side and the outer end of the holder respectively.

2. A holder for a cutting blade which has opposite cutting edges and a medial and end openings spaced lengthwise of the cutting edges, said blade holder having a pair of engaging means spaced transversely of the holder adjacent its outer end and adapted to engage the end openings of the blade for positioning the blade with one of its cutting edges parallel to and projecting beyond the outer end of the holder, the holder also having a single engaging means medially of its width adjacent its inner end and adapted to engage one of the end openings of the blade with the other end opening of the blade engaged by either of said pair of engaging means to position the blade with its opposite cutting edges projecting angularly beyond a side and the outer end of the holder respectively, the single engaging means being also adapted to engage the medial opening of the blade to position the blade lengthwise of the holder with its opposite cutting edges spaced inwardly from the sides of the holder.

In testimony whereof he has affixed his signature to this specification.

LEE F. DUFF.